INVENTOR
JOSEPH F. McCORMICK
BY
OSTROLENK, FABER, GERB & SOFFEN
ATTORNEYS

180° CONDUCTION

360° CONDUCTION

FIG. 4

4a) $i_1$ SOURCE 13

4b) $i_2$ SOURCE 14

4c) $i_3$ ARMATURE 10

4d) $i_4$ DIODE 20

4e) $i_5$ DIODE 21

4f) $i_6$ FIELD 11

4g) $i_7$ FIELD 12

4h) $i_8$ DIODE 32

4i) $i_{10}$ DIODE 30

4j) $i_{11}$ DIODE 31

90° CONDUCTION

270° CONDUCTION

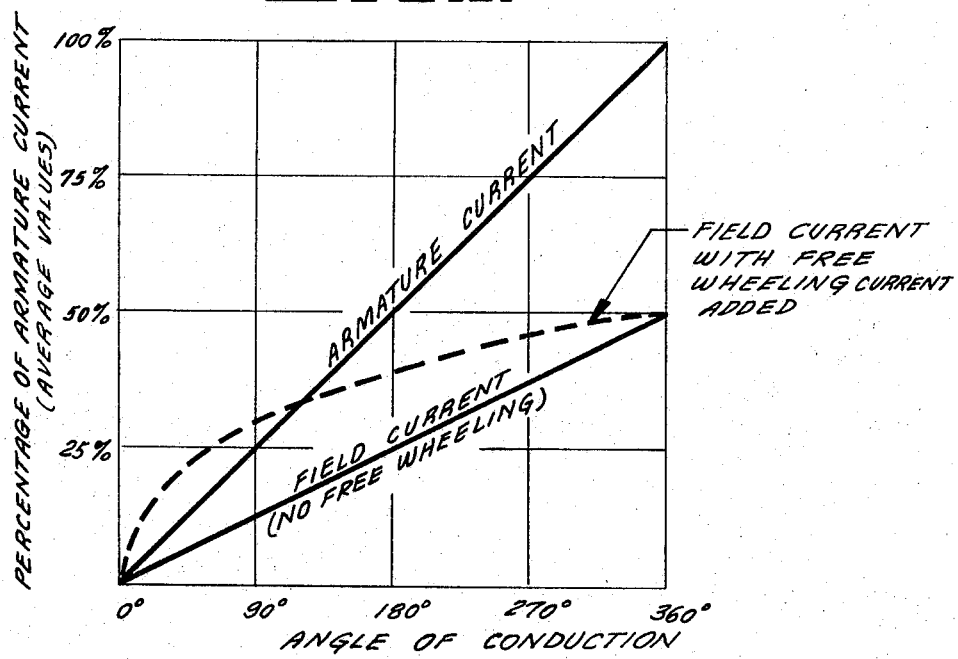
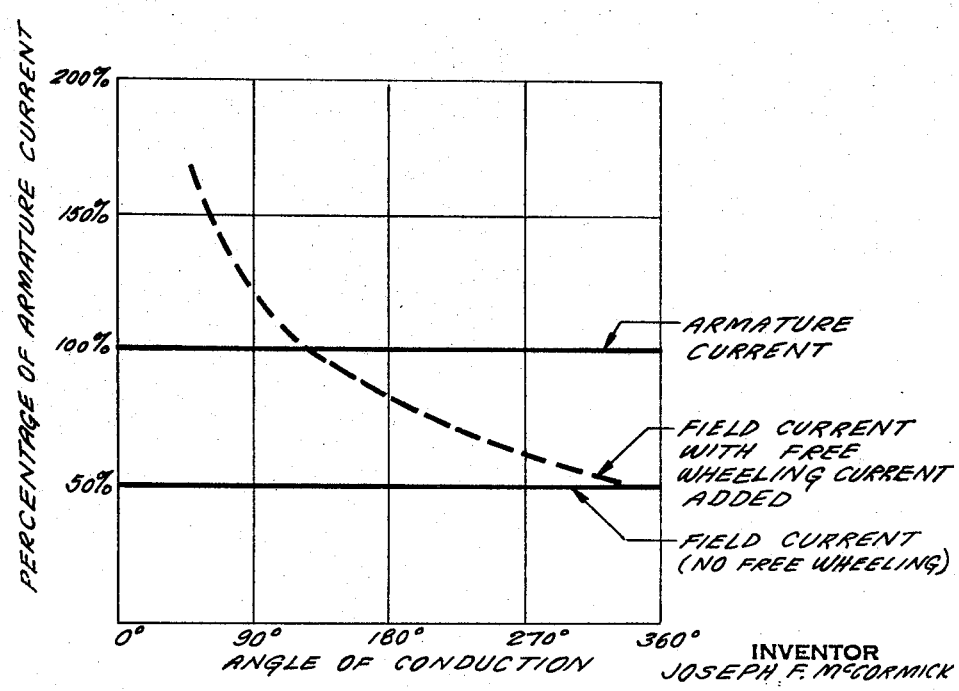

United States Patent Office 3,398,344
Patented Aug. 20, 1968

3,398,344
MOTOR CONTROL FOR D-C MOTORS WITH SERIES FIELD WINDINGS
Joseph F. McCormick, Drexel Hill, Pa., assignor to I-T-E Circuit Breaker Company, Philadelphia, Pa., a corporation of Pennsylvania
Filed June 17, 1965, Ser. No. 464,601
2 Claims. (Cl. 318—252)

ABSTRACT OF THE DISCLOSURE

A speed control for D-C motors using two D-C sources with respective choppers for energizing two field windings and the armature winding of the motor. The output pulses of the choppers are connected to respective field windings prior to overlapping of the output pulses. Freewheeling diodes are associated with the field windings.

This invention relates to a novel smooth speed control arrangement for D-C series motors, and is an improvement of the circuit arrangement shown in copending application Ser. No. 432,684, filed Feb. 15, 1965, entitled "Control Circuit for D-C Motors Having Dual Series Field Windings" in the name of T. R. Kelley, and assigned to the asignee of the present invention, which issued on Aug. 15, 1957, as U.S. Patent 3,336,516.

In the above noted application, an arrangement is provided for smooth control of D-C motors with series field windings wherein two power sources are provided with respective chopper circuits for delivering output voltage pulses of varying duty cycles to a D-C motor. In that application, the choppers which are alternately operated up to a period of overlapping operation each apply power to both field windings prior to overlap condition. Moreover, the above noted circuit required a transformer for changing the field windings from an effective series connection to an effective parallel connection when the pulses from the two choppers begin to overlap one another.

In accordance with the present invention, a novel circuit arrangement is provided wherein the two power sources and their respective choppers supply respective field windings prior to the overlapping condition of the output pulses. Moreover, the prior required transformer for effectively switching the fields from series to parallel connection is replaced by a single diode, in accordance with the invention.

Accordingly, a primary object of this invention is to provide a novel smooth speed control circuit for D-C series motors.

Yet another object of this invention is to provide a novel control arrangement for a D-C motor having two series field windings.

A further object of this invention is to provide a novel stepless control system for D-C motors having two series field windings wherein individual power sources are alternately pulsed for short duty cycles to control only a respective single field winding.

Yet another object of this invention is to provide a novel stepless control system for D-C motors having two series field windings wherein the duty cycle of each field winding is equal to the duty cycle of a respective power source.

These and other objects of this invention will become apparent from the following description when taken in connection with the drawings, in which.

FIGURES 3a through 3j illustrate the currents of FIGURES 2a through 2j, respectively, for 360° (continuous) conduction of each of the choppers.

FIGURES 4a through 4j illustrate the currents of FIGURES 2a through 2j, respectively, for 90° conduction for each of the choppers.

FIGURES 5a through 5j illustrate the currents of FIGURES 2a through 2j, respectively, for 270° conduction for each of the choppers.

Figure 1:
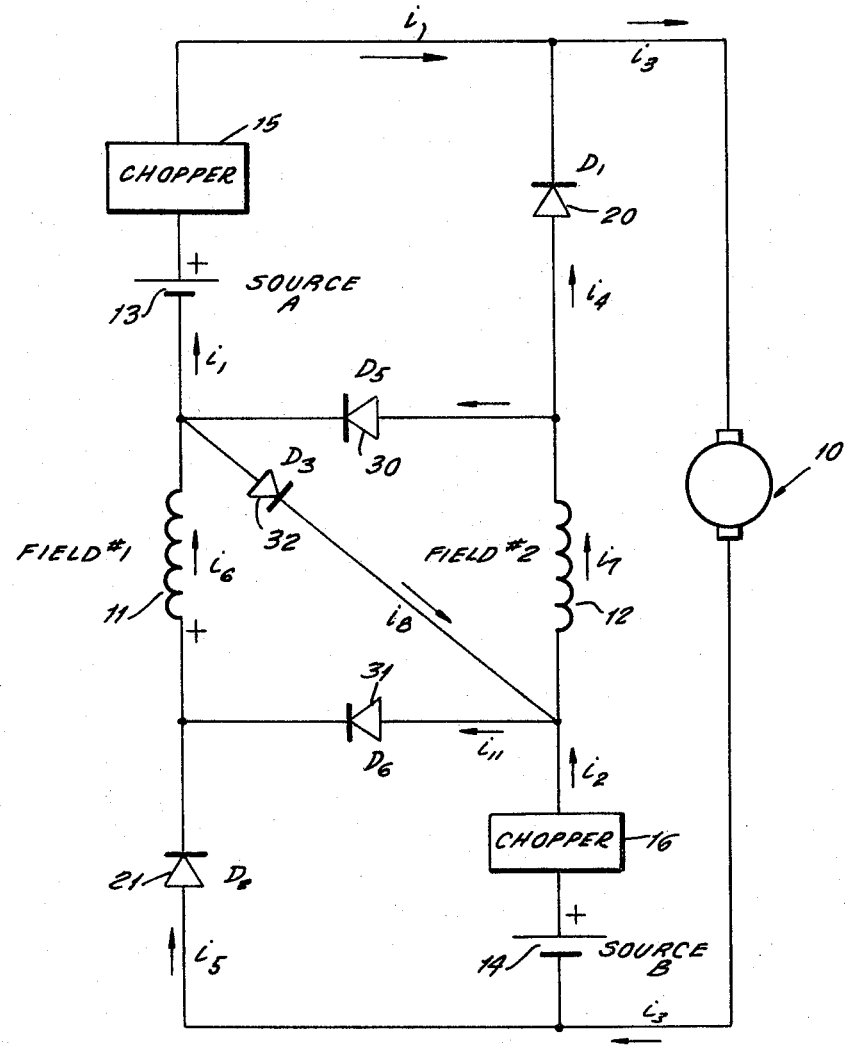
FIGURE 1 is a circuit diagram of the novel system of the invention.
Figure 2:
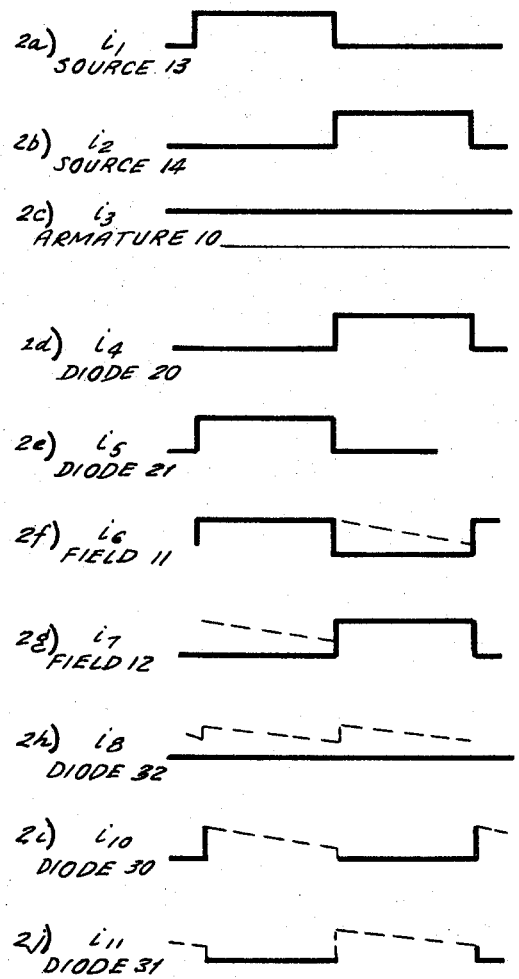
FIGURES 2a through 2j illustrate the current waveshapes in the various components of FIGURE 1 for 180° conduction of each of the choppers.
Figure 3:
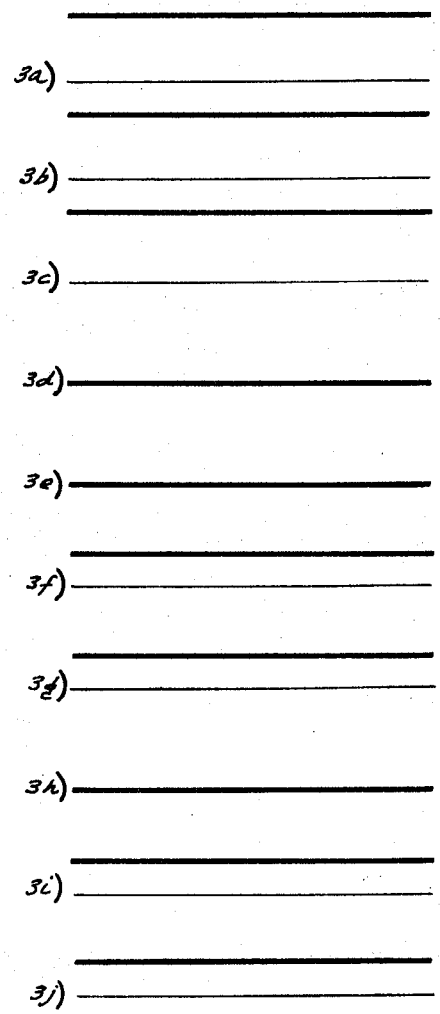

FIGURE 6 illustrates armature and field current as a function of conduction angle for the individual choppers of FIGURE 1.

FIGURE 7 illustrates percentage of armature current as a function of conduction angle for the field currents of FIGURE 1.

Referring now to FIGURE 1, I have illustrated therein a D-C traction motor having a standard armature 10 and two field windings 11 and 12. In accordance with the invention two D-C voltage sources, schematically illustrated as batteries 13 and 14, are connected in series with respective chopper circuits 15 and 16. The choppers 15 and 16 are identical to those units shown in copending application, Ser. No. 432,684, now U.S. Patent 3,336,516, and Ser. No. 451,402, each in the name of Kelley, and assigned to the assignee of the present invention.

Thus, the choppers 15 and 16 are operative to pass current pulses from their respective sources 13 and 14 where the pulses begin at synchronously repetitive intervals 180° displaced from one another, and last for any predetermined length of time until cutoff occurs. Thus, the current pulses delivered by choppers 15 and 16 can appear as repetitive pulses which can be extended to overlap one another.

D-C source 14 and chopper 16 are then connected in closed series circuit with field winding 12, diode 20 and armature 10. In a similar manner, source 13 and chopper 15 are connected in series with armature 10, diode 21 and field winding 11.

Three freewheeling diodes 30, 31 and 32 then interconnect the field windings 11 and 12, as illustrated. As previously noted, the operation of choppers 15 and 16 is synchronized so that they are alternately pulsed to an ON condition for an equal but variable time interval which extends from 0° to 360° for full conduction. Individual conduction of either of choppers 15 and 16 will take place for conduction angles of less than 180°. For conduction angles above 180°, both choppers will conduct simultaneously during the overlap interval.

Assuming that chopper 15 is conducting and chopper 16 is off, current will flow from the positive terminal of voltage source 13 through chopper 15 through armature 10, diode 21 and motor field winding 11 back to the negative terminal of power source 13. When the chopper 15 turns off, the diodes 32 and 31 provide freewheeling paths to dissipate the inductive current of field winding 11.

When chopper 16 turns on and chopper 15 is off, a similar circuit is established through field winding 12. Thus, a circuit is established from the positive terminal of source 14 through chopper 16, motor field winding 12, diode 20, motor armature 10 and back to the negative terminal of voltage source 14. When the chopper 16 turns off, the diodes 30 and 32 provide a freewheeling path to dissipate the inductive current of field winding 12.

When both choppers 15 and 16 are on simultaneously during the overlap period when the choppers conduct for greater than 180°, the current flows from the positive terminal of source 14 through chopper 16 and then divides in the parallel paths, the first of which includes field winding 12 and diode 30; and the second of which includes diode 31 and field winding 11. The circuit then continues in series with voltage source 13 and chopper 15 during the overlap period.

Thus, during overlap, the fields 11 and 12 are effectively in parallel during the overlapping intervals of conduction with each field carrying one-half of the source current.

FIGURES 2a through 5j illustrate the current conditions in the circuit of FIGURE 1 for conditions of 180° conduction, 360° conduction, 90° conduction and 270° conduction, respectively. More specifically, the a portions of each of these figures show the current $i_1$ of source 13. Each of the figures b show the current $i_2$ of source 14. The c, d, e, f, g, h, i and j portions of FIGURES 2 through 5 then similarly indicate the currents $i_3$, $i_4$, $i_5$, $i_6$, $i_7$, $i_8$, $i_{10}$ and $i_{11}$, respectively, which are respectively the current of armature 10, the current of diode 20, the current of diode 21, the current of field winding 11, the current of field winding 12, the current of diode 32, the current of diode 30 and the current of diode 31.

Note that the dashed lines in figure portions f, g, h, i and j represent the freewheeling currents caused by the inductive effects of field windings 11 and 12.

It will be seen that when the conduction angle changes from 180° to 360° (from FIGURE 2 to FIGURE 3), all currents are continuous and the diode currents $i_4$, $i_5$ and $i_8$ are zero, while the field currents $i_6$ and $i_7$ are one-half of the armature current $i_3$ and source currents $i_1$ and $i_2$.

FIGURE 6 illustrates the average values of the armature and field currents of FIGURE 1 for various conduction angles of the choppers 15 and 16. Note that the armature and field currents are directly proportional to the duty cycle, while the average field current in the absence of freewheeling current is equal to one-half of the armature current.

The dotted curve of FIGURE 6 indicates the field current value when the freewheeling current is added.

FIGURE 7 illustrates the relative value of field current to armature current as a function of conduction angle where again the dotted curve of the figure shows the value of the field current when the freewheeling current is added.

It will be seen that the invention provides a stepless control for a D-C motor having two series field windings in a highly efficient manner. Thus, during starting, the individual power sources are alternately pulsed ON and OFF for short duty cycles of from 0° to 180° conduction angles.

The individual field windings will similarly be alternately pulsed for a duty cycle equal to the duty cycle of its respective power source. Thus, the power sources are effectively in parallel for reduced starting voltage which is desired. Because each field winding is alternately in series with the armature 10, the starting resistance will be sufficiently high to limit starting current. Because of the freewheeling action of the fields, the field currents during starting will be higher than armature current so that sufficient magnetic field strength is made available for high starting torques.

As the motor comes up to speed, the counter EMF of the motor reduces the current so that the conduction angle can be increased. As the conduction angle of sources 15 and 16 is increased above 180°, the duty cycle of the power sources 13 and 14 begin to overlap. During this overlap period, the field windings 11 and 12 are effectively connected in parallel, and the power sources 13 and 14 are effectively connected in series.

When a conduction angle of 360° is reached, the fields are completely in parallel and the power sources are completely in series. The transition from parallel sources with alternate operation of the fields to a series source connection with parallel fields is a smooth and stepless transition which does not require the use of power dissipating resistances as has been required in the past.

Although this invention has been described with respect to its preferred embodiments, it should be understood that many variations and modifications will now be obvious to those skilled in the art, and it is preferred therefore that the scope of the invention be limited not by the specific disclosure herein, but only by the appended claims.

The embodiments of the invention in which an exclusive privilege or property is claimed are defined as follows:

1. A motor control circuit for a D-C motor having an armature winding and two field windings; said motor control circuit including a first and second D-C source, a first and second chopper circuit and a first and second diode; said first chopper circuit, said first field winding, said first D-C source, said first diode, and said armature winding connected in a first closed series circuit; said second chopper circuit, said second D-C source, said second field winding, said second diode, and said armature winding connected in a second closed series circuit; and first, second and third freewheeling diodes; said first freewheeling diode connected across one end of each of said field windings; said second freewheeling diode connected across the opposite ends of each of said field windings; said third freewheeling diode connected from one end of said first field winding to the opposite end of said second field winding.

2. A motor control circuit for a D-C motor having an armature winding and two field windings; said motor control circuit including a first and second D-C source, a first and second chopper circuit and a first and second diode; said first chopper circuit, said first field winding, said first diode, said first D-C source, and said armature winding connected in a first closed series circuit; said second chopper circuit, said second D-C source, said second diode, said second field winding, and said armature winding connected in a second closed series circuit; and first, second and third freewheeling diodes; said first freewheeling diode connected across one end of each of said field windings; said second freewheeling diode connected across the opposite ends of each of said field windings; said third freewheeling diode connected from one end of said first field winding to the opposite end of said second field winding; said second diode and said first and second freewheeling diodes conducting forward current in the direction of forward current conduction of said second D-C source; said third freewheeling diode blocking forward conduction current of said second D-C voltage source; said first diode conducting forward conducting current of said first D-C source.

References Cited

UNITED STATES PATENTS 3,336,516    8/1967    Kelley _____ 318—139

ORIS L. RADER, *Primary Examiner.*

G. SIMMONS, *Assistant Examiner.*